(12) United States Patent
Jax

(10) Patent No.: US 8,234,911 B2
(45) Date of Patent: Aug. 7, 2012

(54) METHOD AND APPARATUS FOR DETECTING A LEAK IN A DOUBLE PIPE

(75) Inventor: Peter Jax, Erlangen (DE)

(73) Assignee: Areva NP GmbH, Erlangen (DE)

( * ) Notice: Subject to any disclaimer, the term of this patent is extended or adjusted under 35 U.S.C. 154(b) by 223 days.

(21) Appl. No.: 12/696,450

(22) Filed: Jan. 29, 2010

(65) Prior Publication Data

US 2010/0126250 A1  May 27, 2010

Related U.S. Application Data

(63) Continuation of application No. PCT/EP2008/006356, filed on Aug. 1, 2008.

(30) Foreign Application Priority Data

Aug. 3, 2007 (DE) .......................... 10 2007 036 682

(51) Int. Cl.
G01M 3/04 (2006.01)
(52) U.S. Cl. ............ 73/49.5; 73/40.7; 73/49.1; 73/49.2; 73/49.3
(58) Field of Classification Search ................ 73/40.5 R, 73/40.7, 49.5, 49.2, 49.1, 49.3
See application file for complete search history.

(56) References Cited

U.S. PATENT DOCUMENTS

| 3,191,427 A | 6/1965 | Rapson, Jr. |
| 3,977,233 A | 8/1976 | Issel |
| 4,663,962 A | 5/1987 | Tagesson |
| 5,343,191 A | 8/1994 | McAtamney |
| 5,708,218 A | 1/1998 | Jax |
| 6,171,025 B1 * | 1/2001 | Langner et al. ............ 405/154.1 |
| 6,898,962 B2 | 5/2005 | Jax |
| 6,935,161 B2 * | 8/2005 | Hutchinson ................ 73/40.5 R |
| 2005/0145016 A1 * | 7/2005 | Hutchinson et al. ....... 73/40.5 R |

(Continued)

FOREIGN PATENT DOCUMENTS

DE  2431907 A1  1/1976

(Continued)

OTHER PUBLICATIONS

International Search Report dated Dec. 29, 2008.

Primary Examiner — Hezron E Williams
Assistant Examiner — Hoang Nguyen
(74) Attorney, Agent, or Firm — Laurence A. Greenberg; Werner H. Stemer; Ralph E. Locher

(57) ABSTRACT

In a method for detecting a leak in a double pipe, a medium located in an intermediate chamber between the interior and exterior pipe is moved toward a first end of the pipe, whereupon the medium flows in from the second end. On the first end the medium is examined for any leakage of a characteristic material, upon the detection of which a leakage signal is generated and a location of the leakage is calculated based on the transport time of the characteristic material from the leakage to the first end and on the mass flow of the medium. A corresponding device contains a conveyor unit for moving the medium through the intermediate chamber. A material sensor is disposed at the first end for examining the medium for the characteristic material. A control and analysis unit is provided for generating a leakage signal and calculating the location of the leakage.

9 Claims, 3 Drawing Sheets

U.S. PATENT DOCUMENTS

| | | |
|---|---|---|
| 2005/0166666 A1* | 8/2005 | Tsukagoshi .................... 73/49.1 |
| 2007/0051165 A1 | 3/2007 | Maresca, Jr. et al. |

FOREIGN PATENT DOCUMENTS

| | | |
|---|---|---|
| DE | 19525176 A1 | 1/1997 |
| DE | 69409011 T2 | 2/1999 |
| DE | 10060976 A1 | 6/2002 |
| DE | 102005032132 A1 | 1/2007 |
| EP | 0692706 A2 | 1/1996 |
| WO | 2007006693 A1 | 1/2007 |

* cited by examiner

METHOD AND APPARATUS FOR DETECTING A LEAK IN A DOUBLE PIPE

CROSS-REFERENCE TO RELATED APPLICATION

This is a continuation application, under 35 U.S.C. §120, of copending international application No. PCT/EP2008/006356, filed Aug. 1, 2008, which designated the United States; this application also claims the priority, under 35 U.S.C. §119, of German patent application No. 10 2007 036 682.7-54, filed Aug. 3, 2007; the prior applications are herewith incorporated by reference in their entirety.

BACKGROUND OF THE INVENTION

Field of the Invention

The invention relates to a method and an apparatus for detecting a leak in a double pipe.

Pipelines are used for transporting liquid or gaseous products, such as petroleum or natural gas, predominantly in the petroleum or chemical industry. Since the transported products are generally harmful to the environment, it is desirable for a leak in a pipeline to be detected as quickly as possible, i.e. to recognize it and/or locate it.

In this respect, a system, sold under the trademark LEOS or a method by Siemens AG or AREVA NP GmbH is known for example from published, non-prosecuted German patent application DE 24 31 907 A1 (corresponding to U.S. Pat. No. 3,977,233) or German patent DE 100 60 976 B4 (corresponding to U.S. Pat. No. 6,898,962). It has, over the last few decades, been used in sensitive pipelines, in other words pipelines which transport substances which are particularly at risk of leaks due to environmental conditions or are particularly harmful to the environment. The LEOS method is suitable for recognizing and locating even small, so-called creeping leaks, in which about 1 liter per hour of liquid, or 0.1 cubic meter per hour of gas, exits. The fundamental principle of LEOS is based on a permeable sensor hose into which the leak medium which exits the pipeline diffuses. After sufficient collection of the leaking molecules, they are pumped, in periodic time intervals, to a central measuring system and are detected there using suitable gas sensors. Based on the time difference between switching on the pump and reaching the gas cloud which originates from the leak, the point of the leak can be determined. Here, the interaction of the two processes described below are used, specifically that of a laminar flow in the sensor hose which acts as a pipe and a diffusion of the leaking molecules during transport, which results in a concentration equalization in the radial direction of the sensor hose. The corresponding relationships have become known in the literature under the keyword 'Taylor diffusion in pipes'. The result is a gas cloud which remains concentrated in the axial direction of the sensor hose.

In order to further minimize the risk of an effect on the environment, pipelines are increasingly constructed in the form of double pipes. An internal primary pipe transports the product; an external pipe takes on the task of providing an additional safety barrier with respect to the environment, should the internal pipe begin to leak due to operational effects such as corrosion, pressure swing loading, excessive pressure surges etc.

Such double pipes are in some cases already stipulated in domestic and international transport of crude oil or crude oil products such as gasoline or diesel or are desired as special measures in the case of sensitive environmental conditions such as in the case of subterranean river crossings or overhead lines in the region of the permafrost in Alaska.

Provided that the design conditions of such a double pipe have been implemented with care, this does indeed reduce the risk of potential damage to the environment in principle, but an operationally caused leak of the internal or external pipe is not completely excluded.

It is therefore sensible to provide such a double pipe with a suitable leak monitoring system as well, in order to detect any individual damage to the internal or external pipe of the double pipe early and to thus completely prevent damage to the environment, namely the escape of the product into the environment after the respectively other pipe has sustained damage. The only thing which cannot be prevented hereby is escape of the product after simultaneous damage to the internal and external pipes, which should be ruled out for example by way of design measures of the double pipe or of its environment.

It is now possible in principle in a double pipe for an above-mentioned sensor hose to be placed in the gap between internal and external wall and for the abovementioned leak monitoring system LEOS to be applied in order to thereby achieve a comparatively sensitive leak recognition and location for this boundary condition. This enables sensitive leak recognition and location for small leak rates of the internal pipe—in the sense of advance warning without any direct any threat to the environment. However, moving the sensor hose into the gap in the double pipe is associated with an increased outlay.

A sensitive leak recognition and location is also possible by way of a sensor hose outside the double pipe. However, this does not yield any gain in terms of safety technology since the prior damage to the internal pipe cannot be recognized.

Published, non-prosecuted German patent application DE 195 25 176 A1 discloses a two-stage method, in which the pressure in the gap between the internal and external pipe is continuously monitored in order to indicate major damage both to the internal and also the external pipe. Furthermore, minor damage to the internal pipe is detected by way of circulating the gas in the gap and guiding the gas past probes. The gap forms, together with a monitoring apparatus which contains in particular a pressure vessel, a closed system. For monitoring for leaks, a major part of the gases located in the gap are pumped to the pressure vessel and compressed there. The gas which flows past is monitored by substance sensors. Both monitoring methods are used using time-division multiplexing. Locating the leak is not possible using this method.

German utility model DE 694 09 011 T2 discloses the monitoring of the space between the internal and external pipe such that the medium, which due to design measures of the pipe system exits the internal pipe into the gap or enters into the gap from the external pipe, collects at specific collection sites at which directly sensors for detecting the leak substances are arranged. Leaks are not located in the actual sense here either.

Conventional leak recognition methods would also be possible for double pipes: it is known to monitor the pressure in the gap between the internal and external pipe. By way of example, it is filled with an inert gas such as nitrogen and brought to a level which differs from atmospheric pressure. If there is a leak, the pressure level in the gap falls or rises and the leak is thus indicated. The method can detect only major leak of the internal pipe, and is thus not sufficiently sensitive for small leak rates and cannot ascertain the leak point.

Known is also the monitoring of the pressure in the internal pipe, that is to say of an absolute pressure or of a pressure/time profile with comparative operational conditions etc.

Known is also a quantity comparison method for the product, that is to say a comparison of the quantities of transported product at a feed and removal point along the line.

Due to the large volume of the gap in the case of larger monitoring lengths of the pipeline, the methods have the disadvantage that only greater leaks, that is to say high leak rates of more than 1 cubic meter per hour, can be detected. Moreover, they cannot indicate the leak point.

In the case of a double pipe, it is naturally also not possible to locate the leak of the internal pipe (if the external pipe is intact) by way of visual observation from the outside, which always used to be possible in the case of a single-wall pipeline and was often utilized.

In order to be able to roughly locate the leak point, or to increase sensitivity, designs with dividing the gap into separate sections is known. For example, the gap is divided into respectively closed sections of 1 km length. That means that for an overall length of the pipeline of 65 km, 65 sections are necessary. This, however, requires installation and cabling of many pressure transducers along the pipeline.

SUMMARY OF THE INVENTION

It is accordingly an object of the invention to provide a method and an apparatus for detecting a leak in a double pipe which overcome the above-mentioned disadvantages of the prior art methods and devices of this general type.

The invention is based here on the now described considerations. The LEOS method, that is to say transporting a medium or air column, which is contaminated with leaked molecules in the event of a leak, over the length of the pipeline portion to be monitored, is intended to be largely retained. However, installation of the sensor hose is intended to be dispensed with. The inside of the sensor hose, the so-called sniffer space, is intended to be replaced in this case by the gap between internal and external pipe of the pipe to be monitored, also referred to as sensor space below. The gap itself thus represents a mutated LEOS hose. In addition, the modified conditions in the gap with respect to the previous LEOS hose are intended to be taken into account accordingly.

The object of the invention is achieved, with respect to the method, by a method for detecting a leak in a double pipe, with the double pipe having an internal pipe and an external pipe which surrounds the former with a gap, containing the following step: the gap is filled with a medium. If the medium is ambient air, for example, it is already present in the gap. The medium corresponds to the transport medium inside the hose used in the LEOS method. The medium in the gap is moved in the longitudinal direction of the double pipe, with the result that it flows toward a first end of the double pipe, with medium subsequently flowing in from the second end of the double pipe. At the first end of the double pipe, a first mass flow for the medium flowing out of the gap is acquired and at the second end a second mass flow $Ev_i$ for the medium flowing into the gap is acquired. At the first end, that is to say the exit site of the medium from the gap, the medium is investigated for a substance which is characteristic of a leak. In other words, the medium is searched for leaked molecules. Thus, if the substance is detected in the medium, leaked molecules are present. These can only have entered the gap by way of the internal pipe or external pipe of the double pipe. In this case, therefore, a leak is recognized and a leak signal is produced. According to the LEOS principle, the point of the leak is ascertained on the basis of the transport time of the characteristic substance from the leak to the first end and on the basis of the mass flow of the medium.

As long as the integrity of the two pipe walls, that is to say internal and external pipes, remains intact, the medium which arrives at the first end remains free of the characteristic substance. This can thus be controlled using gas sensors, for example, in arriving measurement air as a medium.

Since the method substantially corresponds to the LEOS method, all the known embodiments of the method are also applicable in the method according to the invention. The following will be mentioned merely by way of example.

The measurement can be continuous, or else, according to the previous LEOS method, batch-wise. The first option has the advantage of simplified and quick monitoring; the latter option provides the advantage of recognizing the leak point from the temporal position of a concentration peak.

The medium can be moved through the gap by way of pumping at the second end or suction at the first end of the double pipe. Thus, feed lines are provided at the ends of a pipeline portion to be monitored, which feed lines are used to pump in or suck in a measurement gas or a measurement liquid, such as cleaned ambient air. This will be referred to as 'measurement air' below.

During transport of the leak molecules in the gap, the same principles of the superposition of fluid mechanics and diffusion are used, which results in an equalization of concentration differences in the circumferential direction and in maintenance of a relatively concentrated gas cloud during transport in the axial direction.

The method is highly sensitive since it is designed with respect to a detection of zero in the normal case to a detectable concentration of the characteristic substance in the case of a leak.

The method is suitable for application for example in a double pipe with a spacer. Such pipes with smaller and larger diameters are used for transporting products of the petroleum industry. Since the flow resistance of the sensor space—compared to that of the sensor hose in the LEOS method—is relatively small, the method is predestined for monitoring pipelines of great lengths.

The method is suitable also for double pipes, for example overhead lines with inside insulation. In this case, pipeline portions with a length of 100 km and possibly more can be monitored.

Due to the complete omission of the sensor hose, the outlay of the measuring system is considerably reduced, specifically down to only the measuring devices or feed and removal lines of the medium at the beginning and end of the pipeline portion.

In particular, a behavior of the transport properties of the sensor space, which behavior is more complex with respect to the previous sensor hose method, needs to be taken into account. This is because in principle, the substances to be detected can now pass into the gap via the internal or external pipe, and in the LEOS sensor hose a substance could only enter the gap from the outside.

In the case of a small leak of the internal or external pipe, the transport properties of the sensor space, more precisely the transport speed in the flow direction viewed downstream of the leak site, also change. The reason for this is that measurement air either flows to the outside, as in the case of a leak of the external pipe when the measurement air is under excessive pressure due to being pumped into the gap; or additional air or vapors flow into the gap when, for example, an excessive pressure in the internal pipe is greater than that in the gap.

In the method according to the invention, the mass flow $Av_i$ of the medium at the first end of the double pipe is determined, to be precise—similar to the case of sampling—at specific time intervals $\Delta t_i$. The summed or integrated transport distance S for the medium thus results from $S=\Sigma \Delta t_i A v_i$.

The transport properties of the 'gap' can, in the intact state, be calibrated using a test peak known from the LEOS method, in that for a short period of time, a concentration cloud is injected during transport of the measurement air at the inlet site, that is to say at the second end of the double pipe. At the same time, the associated measurement curve of all the ascertained mass flows $Av_1$ as a function of the time steps i, the transport time T up to the reaching of the gas sensors at the first end and also as a control parameter the pressure at the first end $p_i$ as a function of the time step i can be measured. The accuracy of the relationship $S=\Sigma \Delta t_i * A v_i$, summed to the expiry of the time T, can thus, similarly to the LEOS method, be controlled and used for the fine calibration of the mass flow transducer.

By acquiring the mass flows at the first and second ends of the double pipe, the mass flow conditions in the gap can be determined still more accurately. In the case of a leak, the first and second mass flows can be used to ascertain a loss rate of material which flows through the leak. The loss rate across the leak can thus be acquired by simultaneously measuring the mass flow $Ev_i$ at the inlet site and the mass flow $Av_i$ at the outlet site as a function of the time step i. With continuous flow condition, it corresponds exactly to the difference $dv_i=Ev_i-Av_i$ and can, with unsteady flow conditions, for example at the beginning of the pumping process, be acquired even more accurately from model calculations. For example, at the beginning of the pumping process, the pressure profile changes along the pipeline. In this transition phase, even in leak-free pipes, the mass flow $Av_i$ at the first end differs from that, $Ev_i$, at the second end. Only when a constant pressure profile has been established over the line, $Ev_i=Av_i$ again.

The medium can be investigated for two different substances which are associated in each case with one leak at the internal pipe and at the external pipe. If the type of substance can be measured separately by way of the selection of suitable gas sensors, it can also be seen whether the leak is at the internal or at the external pipe. In a double pipe, laid in Europe, for crude oil products, for example, it is possible to infer, from the increased level of humidity or crude oil vapors, a leak at the external pipe or, respectively, at the internal pipe if the measurement air comprises dried ambient air with a dew point of under −30° C.

Alternatively or in addition to the recognition of a leak on the basis of the leak molecules or of the characteristic substance, the information from the difference of the mass flow at the inlet and that at the outlet can also be used for the recognition of leaks. As a result, an independent second possibility of leak recognition, for example as backup system if a leak molecule sensor fails, is therefore available. However, this only works if the leak opening is sufficiently great in relation to the cross-sectional area of the sensor space.

In the case of a leak, it is possible to detect from the first and second mass flows, that is to say from the sign of the difference $dv_i$, whether the leak is at the internal pipe or at the external pipe.

Utilizing the temporal change in the mass flows $Av_i$ and $Ev_i$, the migration of a test peak from the inlet site, that is from the second end, to the outlet, that is to say to the first end, can be calculated as two partial sums over the time steps i which are based on the movement downstream of the leak site up to the outlet (time range 0-Tx) and from the inlet up to the leak site (time range Tx-T).

Here, the equation $$\sum_0^{Tx} Av_i \Delta t_i + \sum_{Tx}^T Ev_i \Delta t_i = S$$

applies, or, for the point of leak, $$L = \sum_0^{Tx} Av_i t_i.$$

It must be taken into account that the form of the concentration profile over the time in this leak device appears different than in the case of the LEOS method, since the gas flow which enters at the leak site changes this profile. It can be assumed that during transportation without adsorption and negligible back-diffusion in the case of small leaks, the form resembles the known Gaussian profile, in the case of large leaks, however, the profile becomes increasingly ramp-like. In the former case, the inflow or outflow into the gap via the leak opening during transport is negligible, and in the latter case leak medium continues to enter even during transport. Only if the leak is extremely large can it be advisable to possibly reverse the flow direction within the framework of a special measurement in order to be able to determine the point of time of the start of the ramp. However, this applies only if the mass flow which enters via the leak opening becomes comparable to the cross-sectional area of the sensor space.

Once a leak has been detected, the medium can therefore also be moved from the first to the second end, and at the second end, the medium can be investigated for a substance which is characteristic of a leak, and a point of leak can then be ascertained using the transport time of the characteristic substance from the leak up to the second end and using the mass flow of the medium. This switch-over of the transport direction of the medium can also take place to and from a number of times in order to increase the location accuracy of the leak.

With respect to the apparatus, the object of the invention is achieved by an apparatus for detecting a leak at a double pipe, with the double pipe having an internal pipe and an external pipe which surrounds the former with a gap. The apparatus contains a conveying device for moving a medium through the gap from a second end of the double pipe toward a first end, a substance sensor, arranged at the first end, for investigating the medium for a substance which is characteristic of a leak, a mass flow sensor at the first end for the medium which flows through the gap, and a control and evaluation unit for recognizing a leak when the substance is detected and for ascertaining the point of the leak using the transport time of the characteristic substance from the leak to the sensor and using the mass flow sensor.

The method according to the invention can be carried out in its basic form using such an apparatus. The point of the leak site can be derived from the time difference between switching on the conveying device, for example a pump, and the recognition of a concentration peak over the time, with the above-mentioned formula being able to be used for the leak point.

In order to be able to monitor the double pipe or a pipe portion, the apparatus can contain a respective seal for the gap with an outlet at the first end and an inlet at the second end of the double pipe or pipe portion, with the substance sensor and the mass flow sensor being connected downstream of the outlet.

Thus, for a pipe portion to be monitored, the gap can be provided with a seal at the first and second ends of the pipe portion, wherein an outlet and a substance sensor for the characteristic substance is attached at the first end to the seal and an inlet, in each case for the medium, is attached at the second end to the seal.

The inlet and the outlet can each have a cross section which corresponds, at least approximately, to the free cross section, that is to say about the area of the clear gap between internal and external pipe in the direction of extent of the double pipe. Any internal fittings in the gap, insulation compound etc., must also be taken into account.

Preferably a pressure pump and a device for acquiring the mass flow for inflowing medium are provided at the inlet site, and are used for moving the measurement air in to the gap at periodic time intervals. Alternatively, the pressure pump can be dispensed with and a suction pump can be provided at the outlet site. In that case, the actual measuring system with gas sensors for acquiring the concentration of the characteristic substance as a function of time and a mass flow transducer is located there.

The accuracy of the location can be improved by calibrating using a test peak, as is known from LEOS, and using the mass flow measured at the inlet.

For control purposes or for a more accurate calculation of the flow profiles in the gap, a pressure sensor can also be installed at the outlet site and/or the inlet site, which pressure sensor acquires the respective pressure $p_i$ in the gap. However, it is not absolutely necessary for the measuring method.

The apparatus can contain a diverse substance sensor for characteristic substances which correlate in each case with a leak at the internal pipe and at the external pipe. A leak at the internal pipe and at the external pipe can thus be differentiated.

A further substance sensor can be arranged at the inlet. The abovementioned reversing method, in which the transport direction of the medium is reversed, can thus be carried out.

Other features which are considered as characteristic for the invention are set forth in the appended claims.

Although the invention is illustrated and described herein as embodied in a method and an apparatus for detecting a leak in a double pipe, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
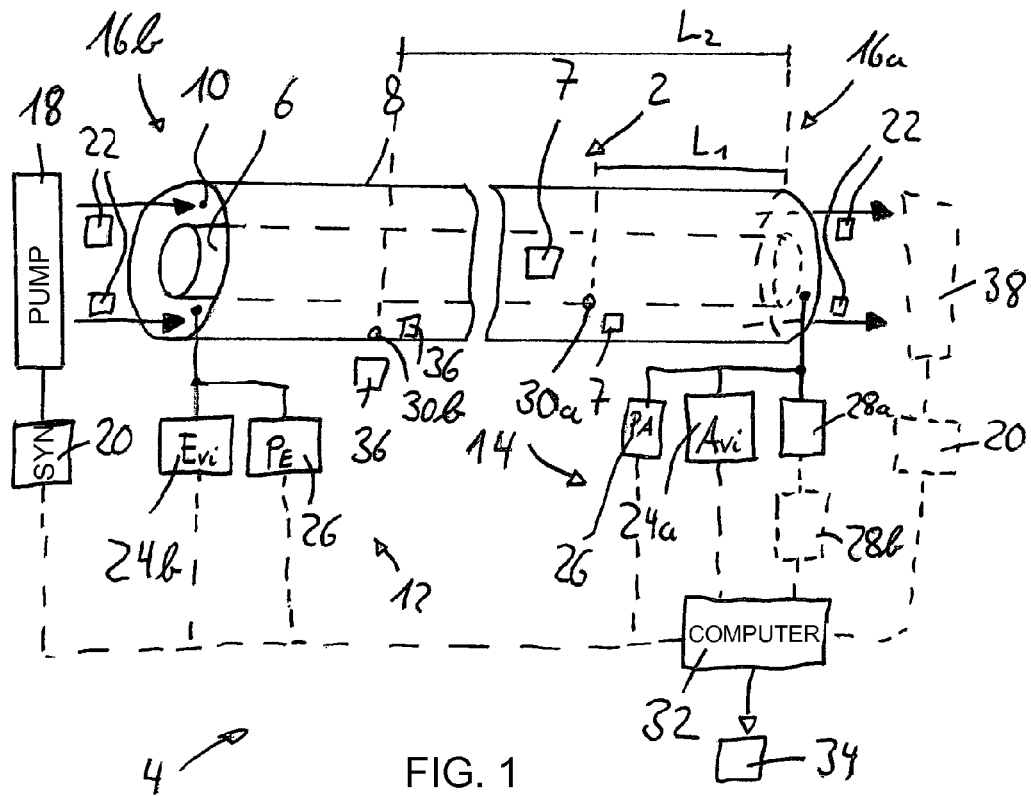
FIG. 1 is an illustration of a double-walled pipeline having a leak monitoring and location system according to the invention.

Referring now to the figures of the drawing in detail and first, particularly, to FIG. 1 thereof, there is shown a pipeline 2 with a system 4 arranged thereon for leak recognition and location. The pipeline 2 has a double-wall design, i.e. contains an internal pipe 6 for transporting a product 7, such as petroleum, and an external pipe 8 which encloses the former concentrically. The external pipe 8 surrounds the internal pipe 6 with a radial space or gap 10.

The system 4 contains a feed part 12 and an evaluation part 14. The evaluation part 14 is arranged at a first end 16a of the pipeline 2, the feed part 12 is arranged at the other end in the direction of extent, i.e. the second end 16b.

The feed part 12 contains a pressure pump 18, which is controlled by a system 20 for time synchronization. The pressure pump 18 is used to push measurement air 22 in the axial direction of the pipeline 2 into the gap 10 if the pressure pump 18 is active. The feed part 12 also contains a mass flow sensor 24b, arranged at the end 16b, for ascertaining the mass flow $Ev_i$ of the inflowing measurement air 22 and a pressure sensor 26 for ascertaining a pressure $p_E$ at the end 16b in the gap 10.

The evaluation part 14 contains a mass flow sensor 24a for determining the mass flow $Av_i$ of measurement air 22 which exits at the first end 16a. It furthermore contains a gas sensor 28a which responds to the product 7 transported in the internal pipe 6.

As long as the internal pipe 6 is without defects, the product 7 does not pass into the gap 10 and the gas sensor 28a does not respond when the measurement air 22 is pumped through by the pressure pump 18. In the case of a leak 30a at the internal pipe 6, however, the product 7 passes into the gap 10 and, after a travel path $L_1$, passes the gas sensor 28a, which detects the product 7 and produces a leak signal 34 via a control computer 32 which likewise belongs to the system 4. The control computer 32 is also used for controlling all the components of the system 4 and is networked with them.

In an alternative embodiment, a second gas sensor 28b is arranged at the first end 16a of the gap 10, which gas sensor reacts to ambient air 36. As long as the external pipe 8 is free of defects, the ambient air 36 does not pass into the gap 10, which is why the sensor 28b is not triggered. In the case of a leak 30b, however, ambient air 36 also passes into the gap 10, which is why, after a second travel path $L_2$, it again passes the gas sensor 28b which likewise outputs via the control computer 32 a leak signal 34, in this case as a leak signal for the external pipe 8.

For a more detailed explanation of the system 4 with respect to cyclic pumping off of the gap 10, leak recognition etc., reference is made to the relevant literature relating to the LEOS system.

In one alternative embodiment, the pressure pump 18 is replaced by a suction pump 38 at the end 16a of the pipeline 2. The measurement air 22 is in that case sucked through the gap 10 rather than pushed.

Alternatively or in addition, a pressure sensor 26 is also arranged at the first end 16a, which pressure sensor ascertains the pressure $p_A$ in the gap 10 at the first end 16a.

FIG. 2 again shows the pipeline 2 in detail, in particular that the pipeline has at the ends 16a, 16b a seal 40 which seals the gap 10 in the axial direction. The gap 10 is thus hermetically sealed by the seals 40, the internal pipe 6 and the external pipe 8. Therefore, an outlet 42 is produced in the external pipe 8 at the first end 16a and an inlet 44 at the second end 16b, which once again provides access to the gap 10. It is thus possible, corresponding to FIG. 1, for measurement air 22 to be pumped or sucked through the gap 10 along the arrows 46.

Figure 2:
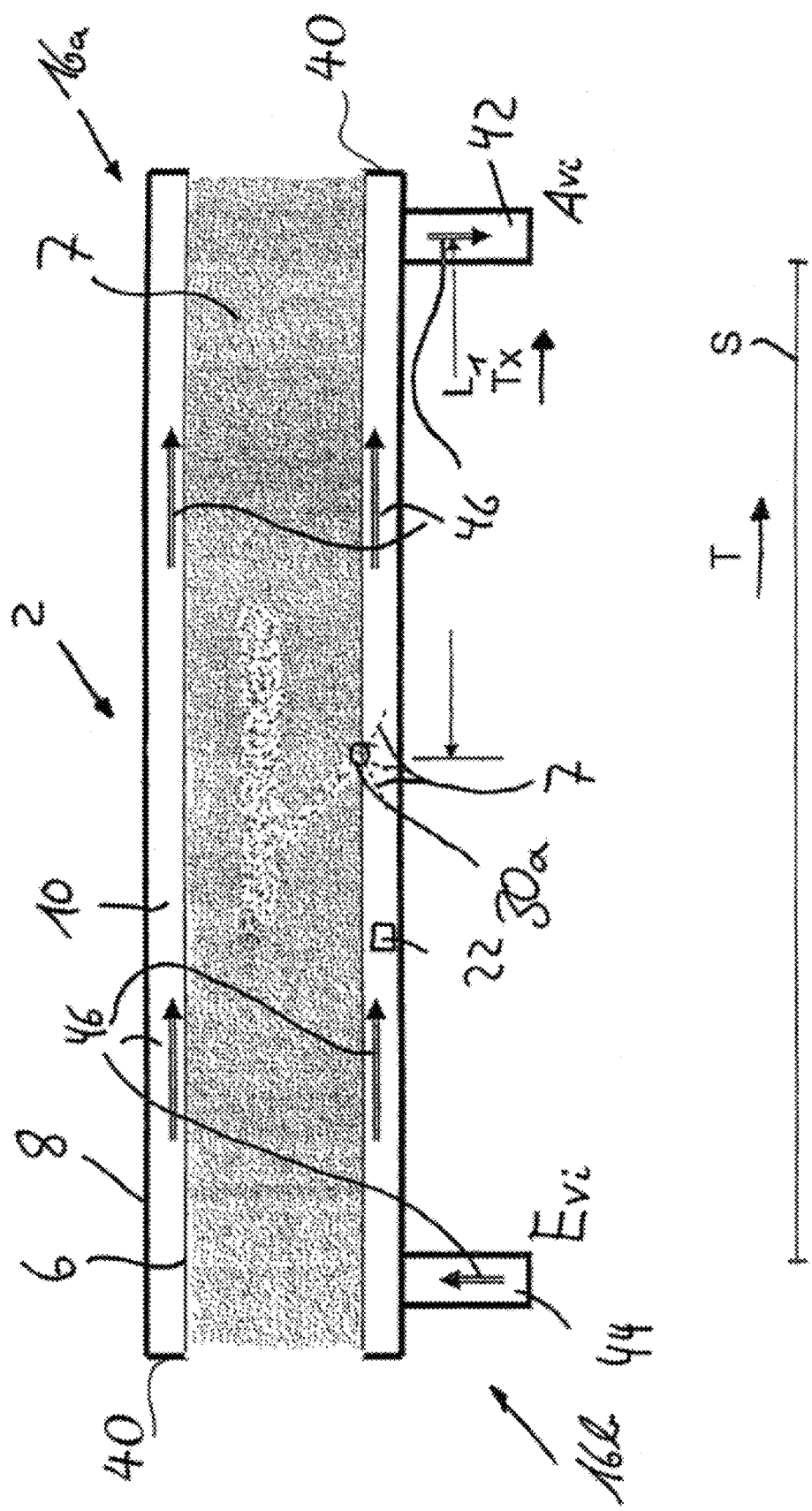
FIG. 2 is a diagrammatic, sectional view of the pipeline shown in FIG. 1.

FIG. 2 also shows the length of a transport distance S for the measurement air 22 from the inlet 44 to the outlet 42, which requires during operation of the pressure pump 18 a travel time T for this. It also shows that product 7 which exits through the leak 30a is entrained by the measurement air 22 from the site of the leak 30a in the direction of the arrows 46 up to the outlet 42, travels along the travel path L1 here and requires the transport time Tx for this.

Figures 3A, 3B, 3C:
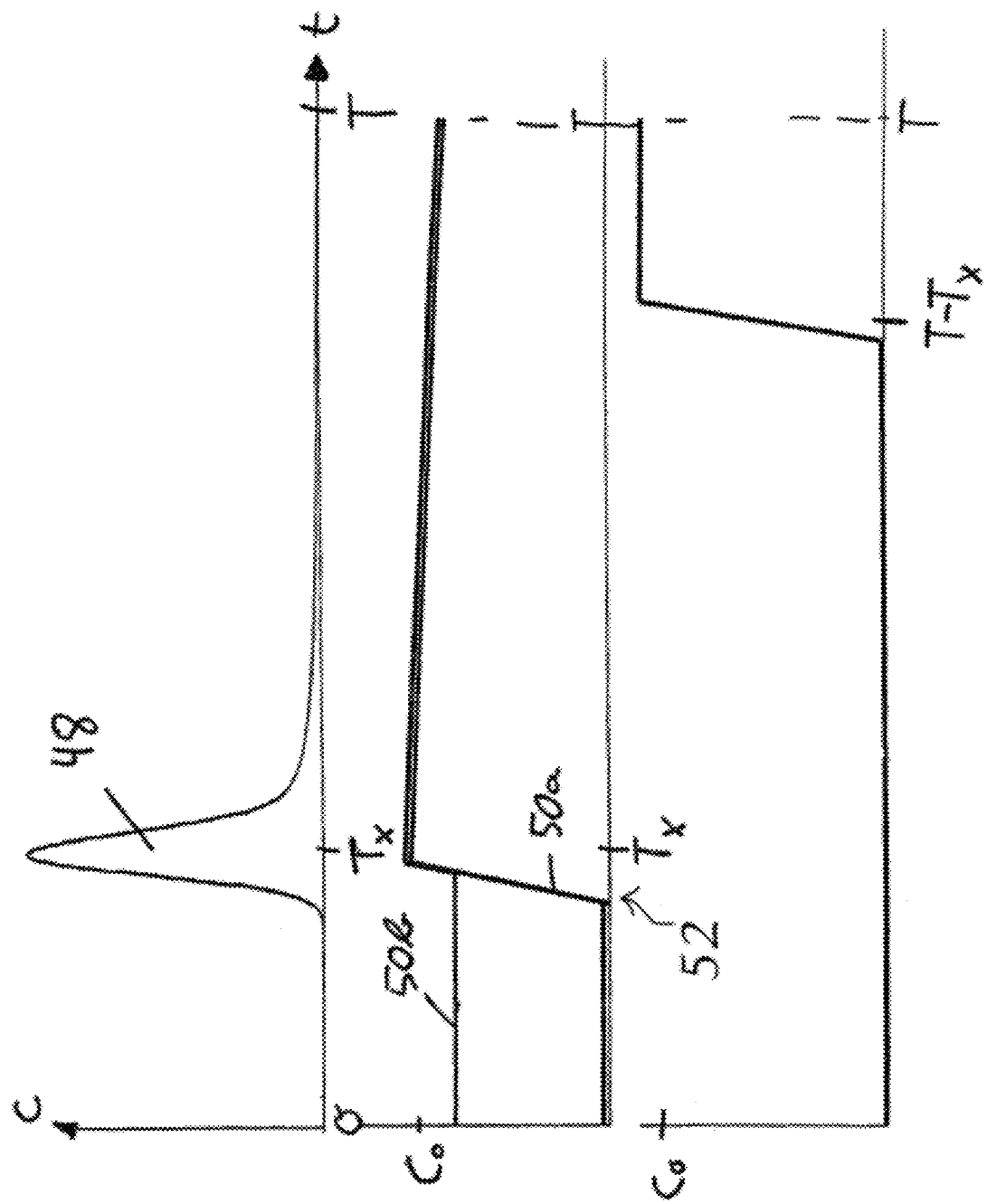
FIGS. 3A-3C are graphs showing measured concentration profiles of leaking substances for a small leak opening (FIG. 3A), a large leak opening (FIG. 3B) and a large leak opening and reversed pumping direction (FIG. 3C)

FIG. 3A shows a time profile, ascertained for a small leak 30a at the gas sensor 28a, of the concentration c of the product 7 over time t. At time t=0, the pump 18 is switched on. The measurement air 22 is pushed through the gap 10. Since the region between the first end 16a and the leak 30a is not contaminated by the product 7, a concentration of c=0 is initially measured. At time Tx, the product 7 transported by the measurement air 22 reaches the sensor 28a, which is why the concentration c increases in the form of a peak 48 and subsequently drops again since the remaining sensor space or gap 10 between the leak 30a and the end 16b of the pipeline 2 was not filled by product 7 either. At time T, the entire measurement air 22 of the gap 10 has been replaced and the pump 18 is switched off again. The leak point of the leak 30a is ascertained from the transport time Tx or the occurrence of peak 48 as a length or travel path $L_1$.

FIG. 3B shows a corresponding concentration profile of the concentration c of product 7 in a first measurement curve 50a for a very large leak 30a. During first pumping off of the measurement air 22 after the occurrence of the leak 30a, the measurement curve 50a results, which, in accordance with peak 48, only increases at time Tx from 0 to a high concentration C0. Since during further pumping off of the measurement air 22, due to the large quantity of outflowing product 7, even the subsequent measurement air 22 contains product 7, the concentration c hardly drops after the transport time Tx.

Therefore, the measurement curve 50b is ascertained in a second measurement cycle, which curve already begins at a concentration other than zero, since by now the entire gap 10 between the leak 30a and the end 16a is contaminated with product 7. The increase 52 in the concentration c at transport time Tx can no longer be determined sufficiently well.

In this case, the pumping direction of the measurement air 22 is therefore reversed, i.e. in FIG. 2, the measurement air 22 is transported counter to the direction of the arrows 46. Since the portion of the pipeline 2 between the leak 30a and the end 16b, however, is not yet contaminated with product 7, since so far, that is to say in the previous pumping operations, fresh measurement air 22 always flowed in to this region from inlet 44, again a concentration c of zero initially results in the reversed pumping direction and only at time T-Tx, due to the reversed pumping direction, again a clear increase in the concentration c to the value $C_0$ occurs.

Figure 4:
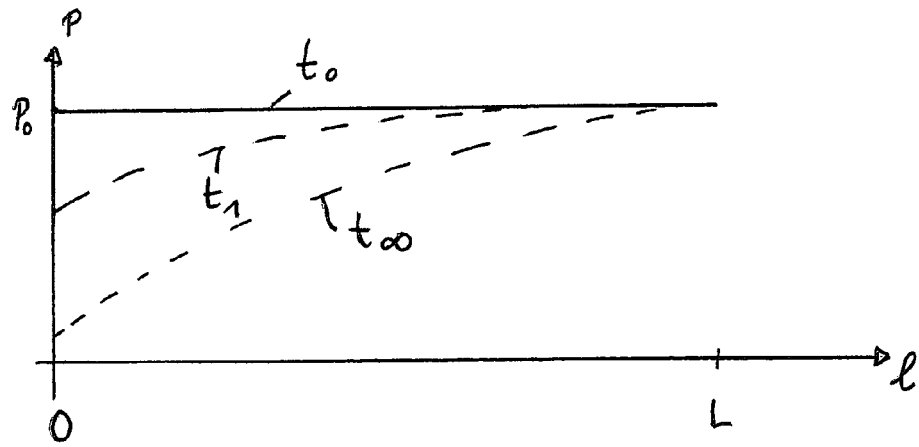
FIG. 4 is a graph showing pressure profiles along the pipeline at different times.

FIG. 4 shows the pressure conditions in the gap 10 at time $t_0$, when no pumping operation occurs. At time $t_0$, the same pressure $p_0$ prevails in the gap 10 over the entire length from first end 16a (length 0) to second end 16b (length L). If now the sucking up of the measurement air 22 at the first end 16a, that is to say at the length L=0, begins, the pressure p locally drops there. At time $t_1$, therefore a pressure drop always changes, which is at its lowest at the end 16a and still has the original value $p_0$ at the end 16b. The measurement flows $Ev_i$ and $Av_i$ are now different.

If the pumping rate is kept constant, after a specific time, theoretically after an infinite amount of time $t_\infty$, constant pressure conditions are established along the pipeline 2, which are shown in FIG. 4 as a line at time $t_\infty$. At time $t_\infty$, the mass flow $Ev_i$ which flows in at the inlet 44 in FIG. 2 is once again the same as the mass flow $Av_i$ which flows out at the outlet 42.

The invention claimed is:

1. A method for detecting a leak in a double pipe, with the double pipe having an internal pipe and an external pipe surrounding the internal pipe with a gap, which comprises the steps of:
    filling the gap with a medium;
    moving the medium in the gap in a longitudinal direction of the double pipe to a first end of the double pipe, with the medium subsequently flowing in from a second end;
    acquiring at the first end and at the second end, in each case a first mass flow and a second mass flow for the medium flowing into and out of the gap;
    investigating, at the first end, the medium for a substance which is characteristic of a leak;
    producing a leakage signal if the substance is detected in the medium;
    ascertaining a transport time of the substance from the leak to the first end as a time difference between switching on a conveying device and detection of the substance;
    ascertaining a point of the leak on a basis of the transport time and on a basis of the first mass flow and second mass flow of the medium; and
    ascertaining, in a case of the leak, a loss rate of the substance which flows through the leak on a basis of the first mass flow and the second mass flow.

2. The method according to claim 1, which further comprises investigating the medium for two different substances which are associated in each case with one leak at the internal pipe and at the external pipe.

3. The method according to claim 1, which further comprises in a case of the leak, detecting the leak on a basis of the first mass flow and the second mass flow whether the leak is at one of the internal pipe and at the external pipe.

4. The method according to claim 1, which further comprises:
    after the leak is detected, moving the medium from the first end to the second end;
    investigating the medium at the second end for the substance which is characteristic of the leak; and
    ascertaining the point of the leak using the transport time of the substance from the leak up to the second end and using the mass flow of the medium.

5. An apparatus for detecting a leak in a double pipe, with the double pipe having an internal pipe and an external pipe surrounding the internal pipe with a gap, the apparatus comprising:
    a conveying device for moving a medium through the gap from a second end of the double pipe toward a first end of the double pipe;
    a substance sensor, disposed at the first end, for investigating the medium for a substance which is characteristic of the leak;
    mass flow sensors with one each disposed at the first end and the second end for the medium which flows through the gap; and
    a control and evaluation unit for producing a leakage signal when the substance is detected and for ascertaining a point of the leak using a transport time of the substance from the leak to said substance sensor and using said mass flow sensors.

6. The apparatus according to claim 5, further comprising seals for the gap, a respective one of said seals disposed at an outlet for the gap at the first end and at an inlet for the gap at the second end of the double pipe, with said substance sensor and said mass flow sensor being connected downstream of the outlet.

7. The apparatus according to claim 6, wherein the inlet and the outlet have a cross section which corresponds, at least approximately, to a free cross section of the gap in a direction of extent of the double pipe.

8. The apparatus according to claim 5, wherein said substance sensor is a diverse substance sensor for the substances which correlate in each case with the leak at the internal pipe and at the external pipe.

9. The apparatus according to claim 6, further comprising a further substance sensor disposed at the inlet.

* * * * *